C. H. ANDERSON.
METAL PASSENGER CAR.
APPLICATION FILED JAN. 29, 1915.
1,148,002. Patented July 27, 1915.
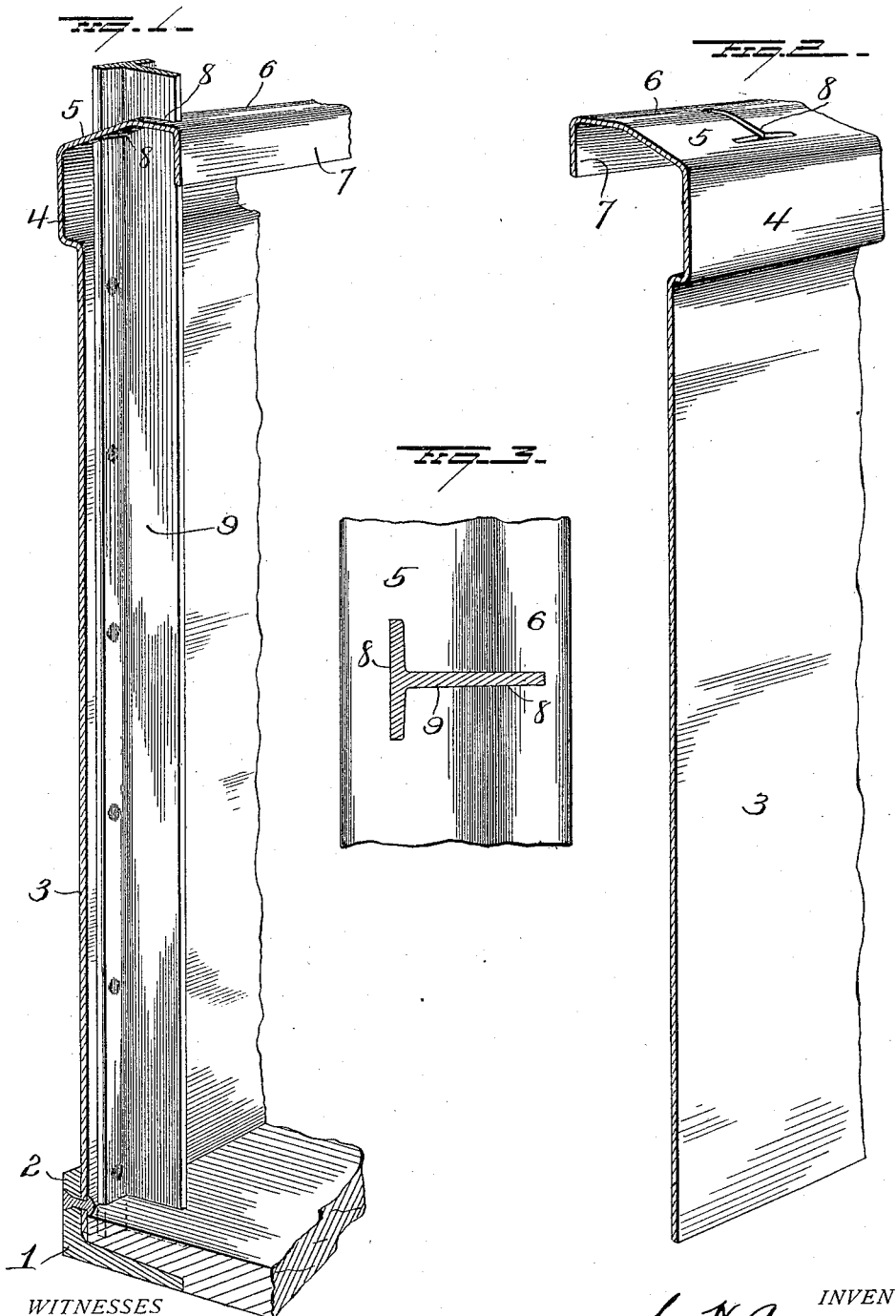

UNITED STATES PATENT OFFICE.

CHARLES H. ANDERSON, OF CINCINNATI, OHIO.

METAL PASSENGER-CAR.

1,148,002.  Specification of Letters Patent.  Patented July 27, 1915.

Application filed January 29, 1915. Serial No. 5,079.

*To all whom it may concern:*

Be it known that I, CHARLES H. ANDERSON, a citizen of the United States, and a resident of Cincinnati, in the county of Hamilton and State of Ohio, have invented certain new and useful Improvements in Metal Passenger-Cars; and I do hereby declare the following to be a full, clear, and exact description of the invention, such as will enable others skilled in the art to which it appertains to make and use the same.

My invention relates to improvements in metal passenger cars, and it consists in the novel manner of connecting the side posts and side plates together, and to the side sill of the car, and also to other details of construction which will be more fully described and pointed out in the claims.

In the accompanying drawings, Figure 1 is a view in perspective of that portion of a steel or metal passenger car embodying my invention; Fig. 2 is a view of a section of the side plate detached and Fig. 3 is a view in horizontal section taken through one of the side posts.

1 represents a metal side sill of a passenger car, preferably L-shaped in cross section with its longer member horizontal for supporting the floor of the car, and its shorter member 2 vertical, and 3 is the sheet metal side plate, the lower edge of which is secured against the inner face of the upright member 2 of the side sill, and is provided at its upper edge with an outward and upward bend 4, an upwardly inclined portion 5, a horizontal portion 6 and a downwardly bent edge 7, the parts 4, 5, 6 and 7 all being integral with the side plate 3. The parts 5 and 6 of the plate 3 constitute the window sills, and the part 6 thereof is provided with closed T-shaped slots 8, for the passage of the T-shaped side posts 9, which are secured at their lower ends to the side sills 1 and support the roof of the car. The side plates are riveted to these side posts 9. The slots 8 are T-shape in cross section, and the posts 9 are located between the windows and may form the side frames of the latter.

In assembling the parts the plate 3 is first secured to the side sill after which the posts 9 are inserted endwise through the slots 8 and are secured to the side sills and to the side plates and brace and support the latter throughout the length of the car. After the posts are inserted in the sill sections of the side plates, they are electrically welded to the latter.

By constructing the window sills integral with the side plates and passing the side posts through closed slots in said sill portion of the side plate, I greatly simplify and cheapen the construction and eliminate a number of separate parts the necessary fitting and riveting of the same.

Having fully described my invention what I claim as new and desire to secure by Letters-Patent, is:—

1. In car construction the combination of a side sill, side plate having an inwardly turned upper edge forming the window sills, the said window sills portions having closed slots formed therein, and side posts passed through said closed slots and secured to the side sill, the side plates being secured to the side posts and braced by the latter.

2. In car construction the combination of L-shaped side sills, side plates secured at their lower edge to said sills and provided with inwardly bent upper edges the latter having closed T-shaped slots therein, and T-shaped side posts passed through said slots and secured at their lower ends to the upright members of the side plates the latter being secured to the side posts intermediate the upper and lower edge of said plates.

3. In car construction the combination of L-shaped side sills, side plates secured to said sills and having outwardly upwardly and inwardly bent upper edges, the inwardly bent portions having closed T-shaped slots formed therein and T-shaped side posts passed endwise through said slots and secured at their lower ends to the side sills and to the side plates.

In testimony whereof, I have signed this specification in the presence of two subscribing witnesses.

CHARLES H. ANDERSON.

Witnesses:
A. W. KROHME,
WM. J. ZIEGENHARDT.